E. F. TOWNSEND.
DRAFT RIGGING FOR MOTOR VEHICLES.
APPLICATION FILED DEC. 11, 1919.
1,377,609.
Patented May 10, 1921.
2 SHEETS—SHEET 1.
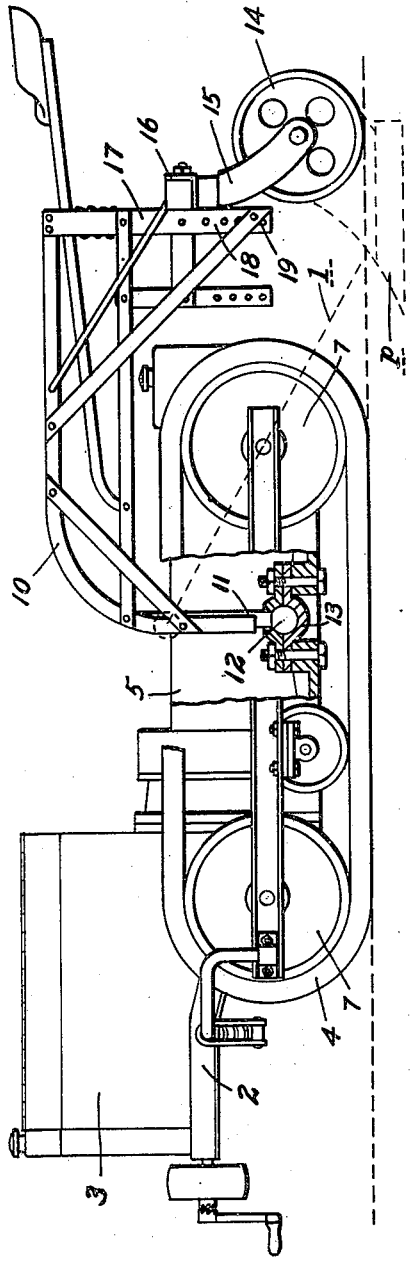
INVENTOR
ERNEST F. TOWNSEND
BY *Hazard & Miller*
ATT'YS.

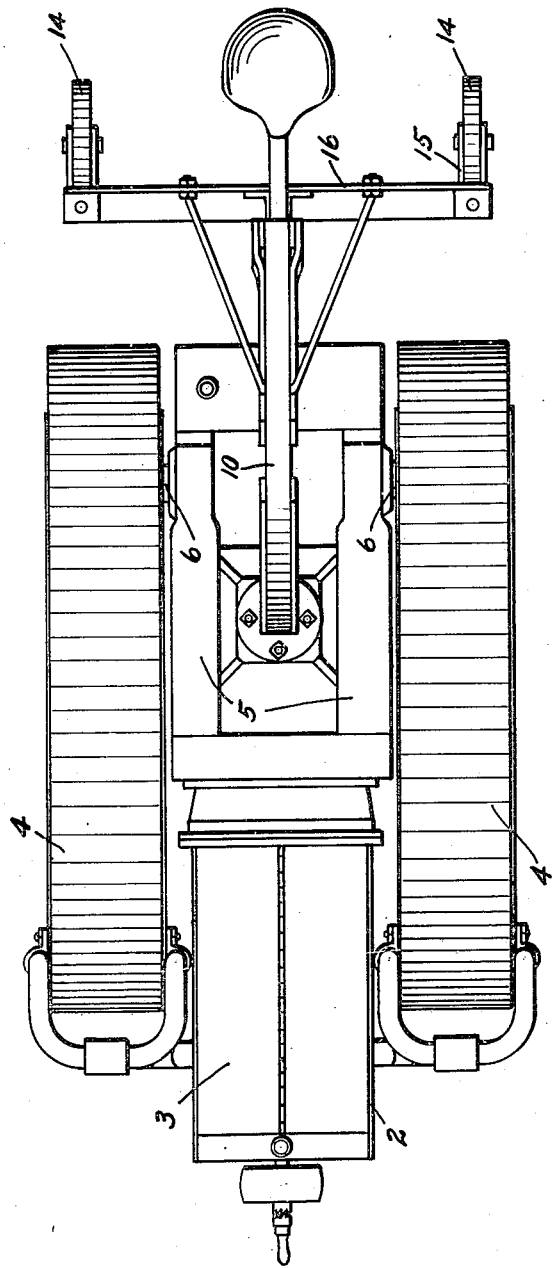

UNITED STATES PATENT OFFICE.

ERNEST F. TOWNSEND, OF LOS ANGELES, CALIFORNIA, ASSIGNOR TO LUCRETIA A. TOWNSEND, OF LOS ANGELES, CALIFORNIA.

DRAFT-RIGGING FOR MOTOR-VEHICLES.

1,377,609.      Specification of Letters Patent.     Patented May 10, 1921.

Application filed December 11, 1919. Serial No. 344,161.

*To all whom it may concern:*

Be it known that I, ERNEST F. TOWNSEND, a citizen of the United States, residing at Los Angeles, in the county of Los Angeles and State of California, have invented new and useful Improvements in Draft-Rigging for Motor-Vehicles, of which the following is a specification.

This invention relates to tractors and has for its object to increase the factor of safety with which a tractor, especially of the endless belt type, can be turned in its course, and has further for its object to provide a tractor having a draft rigging connected to the tractor organization at a point below or substantially in the plane of the center of gravity of the vehicle and whereby the resistance of the load can be so taken by the vehicle as to reduce the tilting tendency of the vehicle on its supporting wheels or belts; and the invention consists of the construction, the combination and details and arrangement of the parts, an embodiment of which is illustrated in the accompanying drawings and described and claimed herein.

Figure 1 is a side elevation of an endless platform or belt tractor partly broken away to illustrate the connection of the draft rigging.

Fig. 2 is a plan view of the improved tractor and rigging.

It is desirable to provide an improvement in tractors wherein a draft rigging is so connected that the load can be connected close up to the rear of the tractor or at a suitable distance away from the same to increase the safety with which the vehicle may be operated in a straight, or in a curved, or changeable course, and to that end I have shown a tractor of the endless belt type generally indicated and including a suitable frame 2 having a motor 3 with side endless platforms or belts 4—4 operated in any suitable manner by transmission devices arranged in housings 5 having driving shafts 6 for the belts 4—4.

To enable the vehicle to be turned sharply in its course with respect to a trailing vehicle or apparatus that is connected to and drawn by the tractor, I have provided a draft fixture or fitting shown as including a generally U-shaped frame 10 arranged to straddle over the rear structure of the tractor frame and also over the side upper portions of the belts according to the angle of the vehicle with relation to the position of the draft rigging. I have also provided a draft fitting that is so connected to the frame work of the vehicle that the line of draft as between the load and the connecting point of the fitting to the vehicle frame will result in a downward load or pressure distributed between all of the supporting wheels or members of the vehicle, or in other words I provide a fitting that is so jointed to the vehicle that the point of application of the load is in a horizontal plane passing through or below the center of gravity of the vehicle, with the result that the tendency of the load to tilt the vehicle on its wheels or supports is materially reduced, if not entirely overcome.

It is obvious that the joint or point of connection of the rigging to the vehicle may be located as desired or convenient with respect to the longitudinal axis or medial plane of the vehicle, and in the present case the frame 10 is shown as having at its forward and downturned end a swivel post 11 substantially vertical on the lower end of which is formed a ball or other suitable flexible joint 12 mounted in a complementary socket 13; the center of oscillation of this universal or flexible joint being slightly below the plane of the axles of the driving wheels 7 of the traction belts 4. The trailing end of the draft fixing 10 is shown as having a pair of supporting wheels 14 in caster bearings 15 mounted in the opposite ends of a transverse bar 16 attached to the downwardly extending legs 17 of the frame structure of the fixture 10.

The draft rigging or fixture is provided with a clevis receiving or draft member 18 that may be suitably disposed with respect to the rear end of the traction vehicle so as to clear the same when the vehicle body turns relatively to the draft rigging, and in this case the draft bar 18 is provided with a series of apertures 19 to which a clevis or other fastening device may be attached.

From the above it will be seen that the vehicle not only operates with an increased factor of safety by the elimination of the tendency of the load to overturn the same, but furthermore it is possible to change the course of travel of the implement abruptly by enabling the traction engine to be turned on a vertical axis with respect to the draft fixture or fitting 10.

Various changes may be made without departing from the spirit of my invention as claimed.

I claim:

1. In a self-propelled vehicle, a load carrying frame extending over the rear axle of the vehicle and connected to said vehicle at a point forwardly of said axle and below the center of gravity of said vehicle.

2. In a self-propelled vehicle, a U-shaped load carrying frame, the intermediate member of said frame extending over the rear axle of the vehicle and the forward arm of the frame being connected to the vehicle at a point forwardly of said axle below the center of gravity of the vehicle.

3. In a self-propelled vehicle, a U-shaped load carrying frame, the intermediate member of said frame extending over the rear axle of the vehicle, the forward arm of the frame being connected to the vehicle at a point forwardly of said axle below the center of gravity of the vehicle, and a roller rolling on the ground on which the rear arm of said frame is mounted.

4. In a self-propelled vehicle, a load-carrying frame extending over the rear axle of the vehicle and connected to said vehicle at a point forwardly of said axle, said point being so located that a line drawn therefrom to the load will pass below said rear axle.

In testimony whereof I have signed my name to this specification.

ERNEST F. TOWNSEND.